(12) United States Patent
Qi et al.

(10) Patent No.: US 10,495,996 B1
(45) Date of Patent: Dec. 3, 2019

(54) SURFACE ADDITIVE INFRARED TAGGANT TONER

(71) Applicant: XEROX CORPORATION, Norwalk, CT (US)

(72) Inventors: Yu Qi, Penfield, NY (US); Jaclyn Janis, Rochester, NY (US); Eugene F. Young, Rochester, NY (US); Shigeng Li, Penfield, NY (US); Chieh-Min Cheng, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/149,608

(22) Filed: Oct. 2, 2018

(51) Int. Cl.
| | |
|---|---|
| *G03G 9/08* | (2006.01) |
| *G03G 9/087* | (2006.01) |
| *C08G 63/676* | (2006.01) |
| *G03G 5/07* | (2006.01) |
| *G03G 5/06* | (2006.01) |
| *G03G 9/09* | (2006.01) |
| *G03G 9/097* | (2006.01) |

(52) U.S. Cl.
CPC ....... *G03G 9/08755* (2013.01); *C08G 63/676* (2013.01); *G03G 5/0601* (2013.01); *G03G 5/07* (2013.01); *G03G 9/0902* (2013.01); *G03G 9/09708* (2013.01)

(58) Field of Classification Search
CPC .................... G03G 9/0902; G03G 9/09708
USPC .......................................... 430/108.6, 107.1
See application file for complete search history.

(56) References Cited

U.S. PATENT DOCUMENTS

| | | |
|---|---|---|
| 2,874,063 A | 2/1959 | Greig |
| 3,590,000 A | 6/1971 | Palermiti et al. |
| 3,655,374 A | 4/1972 | Palermiti et al. |
| 3,720,617 A | 3/1973 | Chatterji et al. |
| 3,983,045 A | 9/1976 | Jugle et al. |
| 4,265,990 A | 5/1981 | Stolka et al. |
| 4,298,672 A | 11/1981 | Lu |
| 4,338,390 A | 7/1982 | Lu |
| 4,563,408 A | 1/1986 | Lin et al. |
| 4,584,253 A | 4/1986 | Lin et al. |
| 4,935,326 A | 6/1990 | Creatura et al. |
| 4,937,166 A | 6/1990 | Creatura et al. |
| 5,227,460 A | 7/1993 | Mahabadi et al. |
| 6,004,714 A | 12/1999 | Ciccarelli et al. |
| 6,063,827 A | 5/2000 | Sacripante et al. |

(Continued)

*Primary Examiner* — Mark A Chapman
(74) *Attorney, Agent, or Firm* — Pillsbury Winthrop Shaw Pittman LLP

(57) ABSTRACT

A toner composition includes toner particles having a resin and a colorant, the composition further including an infrared luminescent taggant disposed on the surface of the toner particles. A method of making a toner composition includes toner particles having a resin and a colorant, the composition further including an infrared luminescent taggant disposed on the surface of the toner particles, the method includes blending toner particles with a surface additive package that includes the infrared luminescent taggant. An article includes a printed image disposed on the article, the printed image made with a toner composition including toner particles having a resin and a colorant, the composition further including an infrared luminescent taggant disposed on the surface of the toner particles, the printed image allowing authentication of the article by infrared detection of the infrared luminescent taggant.

18 Claims, 6 Drawing Sheets

(56) References Cited

U.S. PATENT DOCUMENTS

| | | | |
|---|---|---|---|
| 6,190,815 B1 | 2/2001 | Ciccarelli et al. | |
| 2009/0220789 A1* | 9/2009 | DeSimone | B82Y 10/00 |
| | | | 428/402 |
| 2017/0031255 A1* | 2/2017 | Coyle | G03G 9/0821 |

* cited by examiner

SURFACE ADDITIVE INFRARED TAGGANT TONER

BACKGROUND

The present disclosure relates to toners. In particular, the present disclosure relates to toner additives comprising taggant materials for security applications.

The development of printing techniques that enable security is desirable for anti-counterfeiting, brand protection, and security packaging applications. Various means of including taggant materials for such applications have been developed. For example, infrared taggant materials have been incorporated within the core toner particle structure during the emulsion aggregation process. Other means of incorporating taggant materials include encapsulating toner particles with taggant material or using taggant particle aggregates in conjunction with toner.

SUMMARY

In some aspects, embodiments herein relate to toner compositions comprising toner particles comprising a resin and a colorant, the toner composition further comprising an infrared luminescent taggant disposed on the surface of the toner particles.

In some aspects, embodiments herein relate to methods of making a toner composition comprising toner particles comprising a resin and a colorant, the toner composition further comprising an infrared luminescent taggant disposed on the surface of the toner particles, the method comprising blending toner particles with a surface additive package comprising the infrared luminescent taggant.

In some aspects, embodiments herein relate to articles comprising a printed image disposed on the article, the printed image made with a toner composition comprising toner particles comprising a resin and a colorant, the toner composition further comprising an infrared luminescent taggant disposed on the surface of the toner particles, the printed image allowing authentication of the article by infrared detection of the infrared luminescent taggant.

BRIEF DESCRIPTION OF DRAWINGS

Various embodiments of the present disclosure will be described herein below with reference to the figures wherein.

DETAILED DESCRIPTION

Figure 1A:
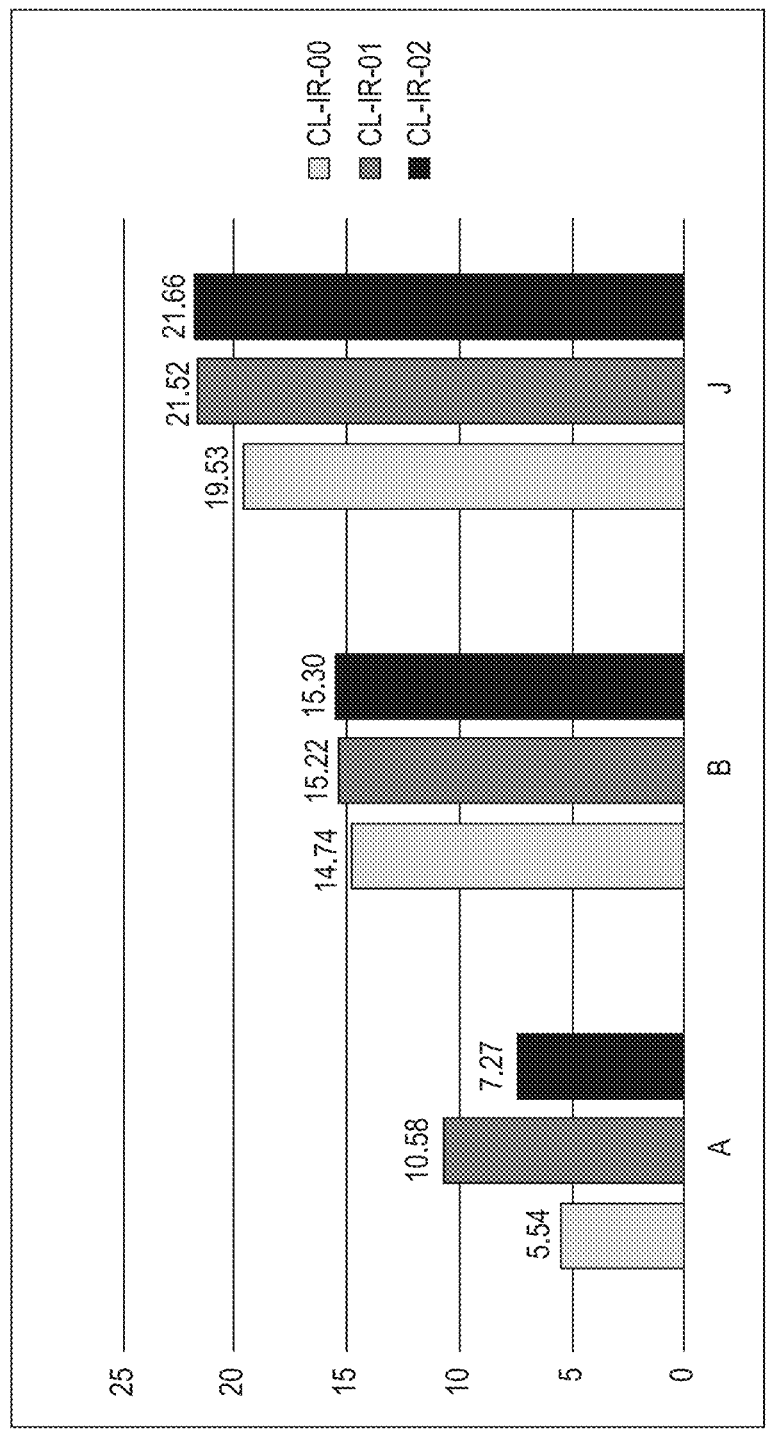
FIG. 1A shows graphical plots of triboelectric charging for three samples of clear toner at three different taggant concentrations CL-IR-00=0%, CL-IR-01=0.05 wt %, CL-IR-02=0.1 wt % under different temperature/humidity conditions A (26.7° C./RH 80%), B (21.1° C./RH 50%, J (21.1° C./RH 10%); vertical axis (µC/g).
Figure 1B:
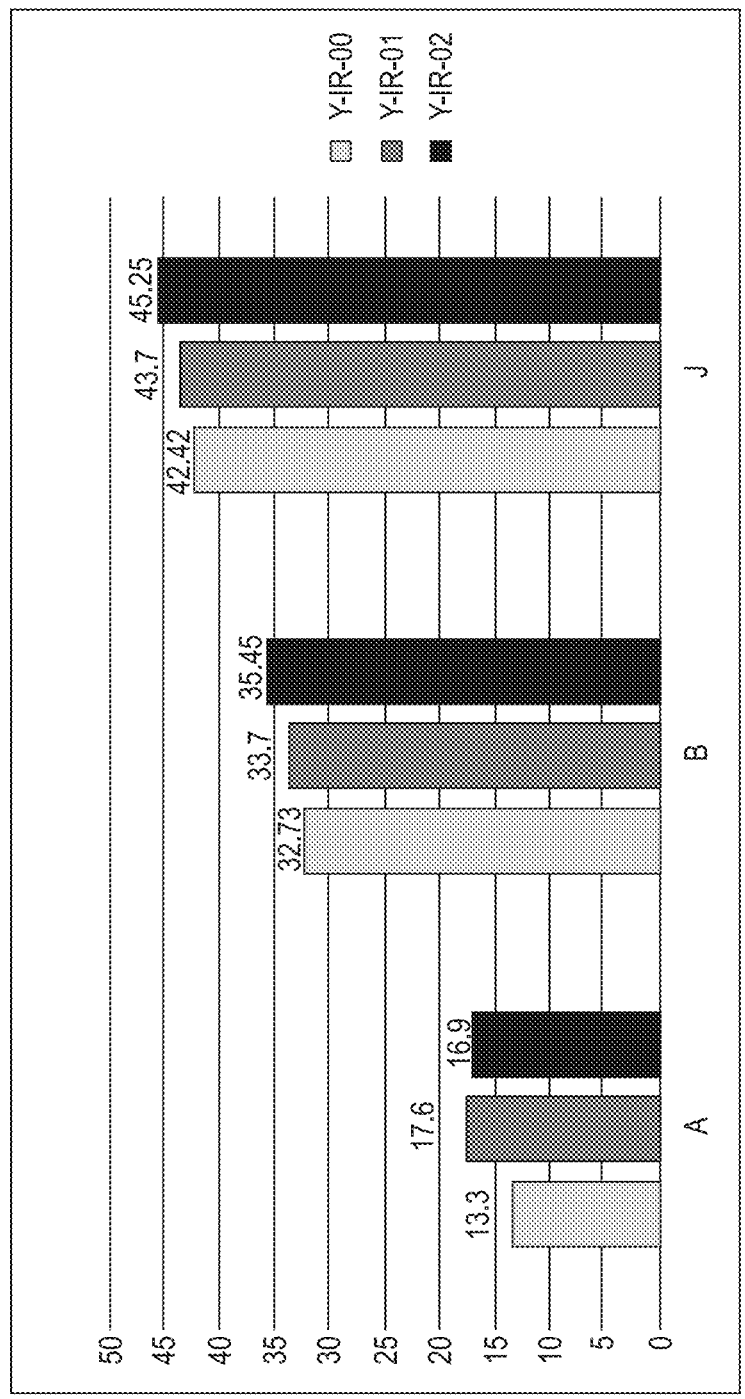
FIG. 1B shows graphical plots of triboelectric charging for three samples of yellow toner at three different taggant concentrations Y-IR-00=0%, Y-IR-01=0.05 wt %, Y-IR-02=0.1 wt %] under different temperature/humidity conditions A (26.7° C./RH 80%), B (21.1° C./RH 50%, J (21.1° C./RH 10%); vertical axis (µC/g).
Figure 1C:
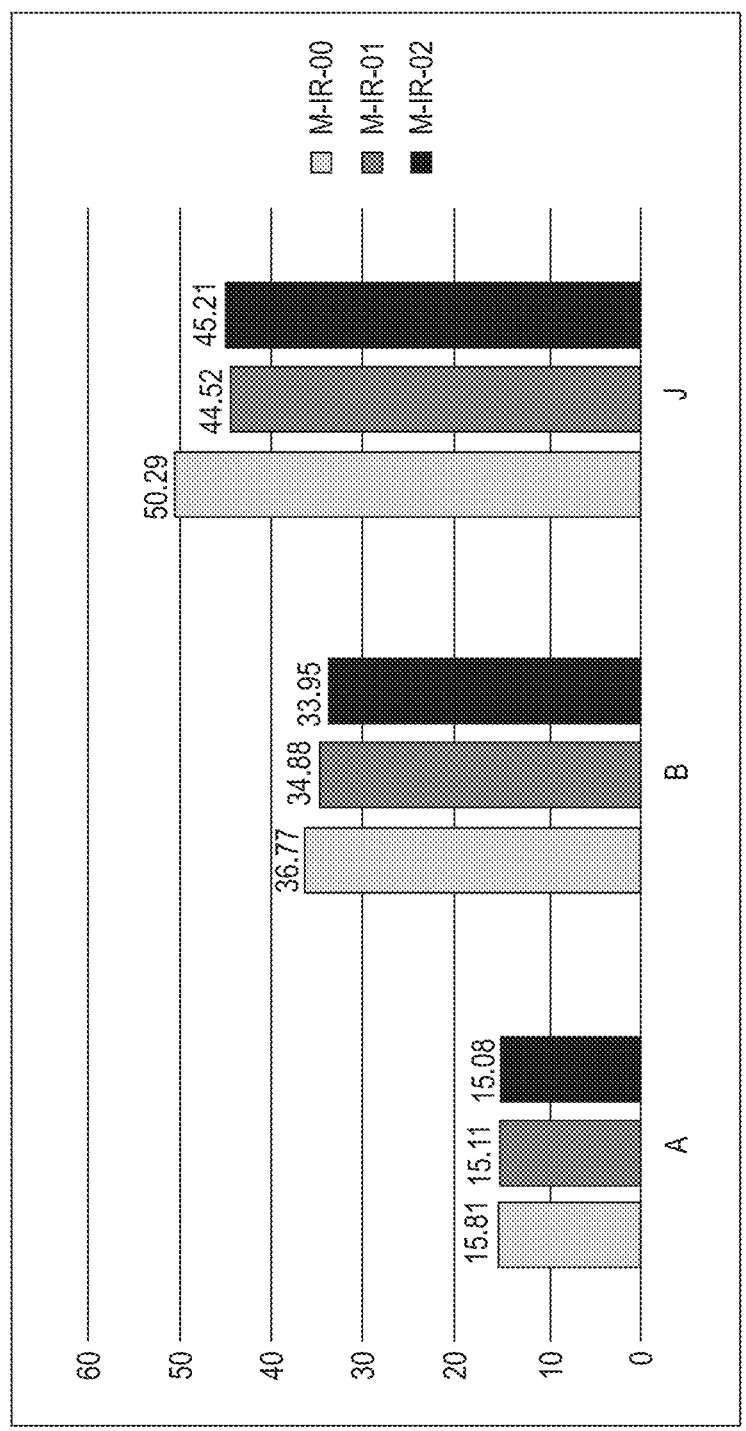
FIG. 1C shows graphical plots of triboelectric charging for three samples of magenta toner at three different taggant concentrations M-IR-00=0%, M-IR-01=0.1 wt %, M-IR-02=0.5 wt % under different temperature/humidity conditions A (26.7° C./RH 80%), B (21.1° C./RH 50%, J (21.1° C./RH 10%); vertical axis (µC/g).
Figure 1D:
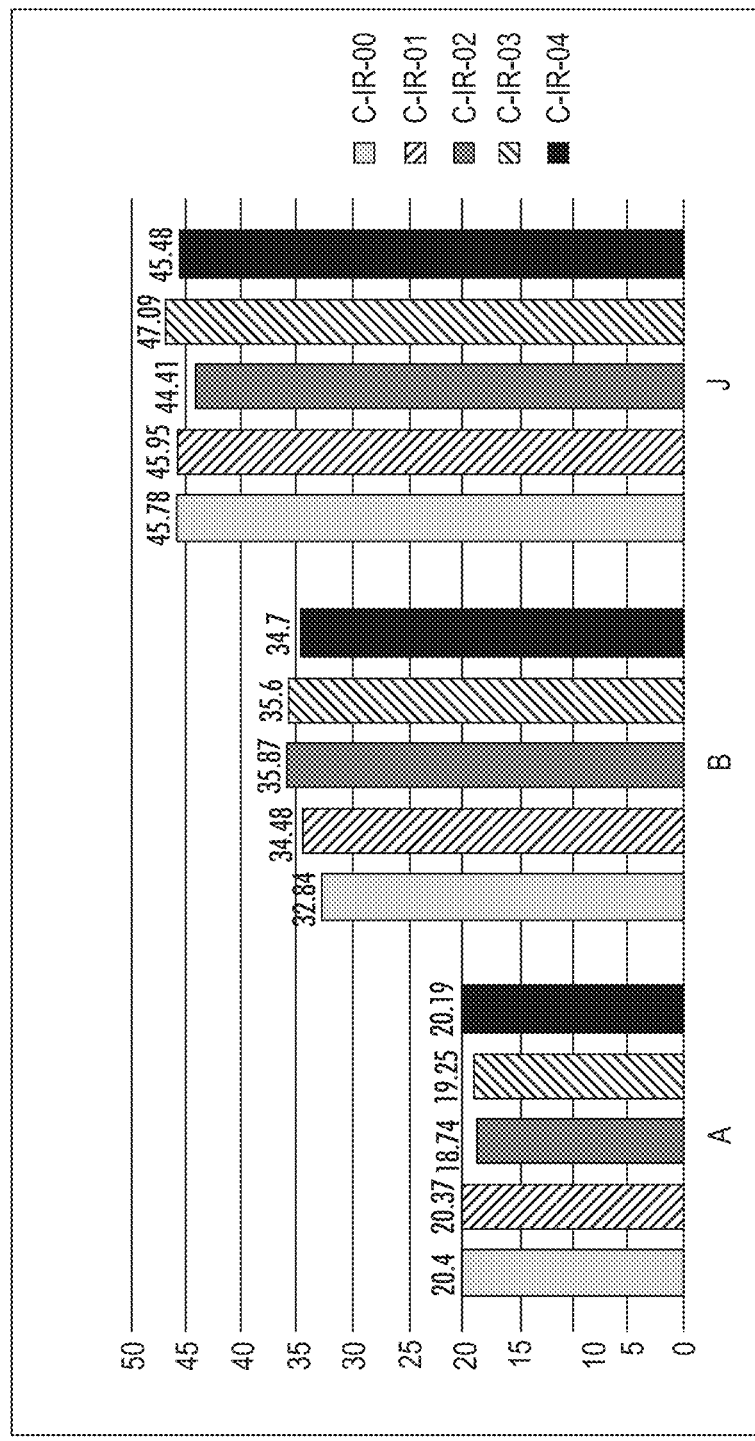
FIG. 1D shows graphical plots of triboelectric charging for five samples of cyan toner at five different taggant concentrations C-IR-00=0%, C-IR-01=0.1 wt %, C-IR-02=0.5 wt %, C-IR-03=1 wt %, C-IR-04=2 wt % under different temperature/humidity conditions A (26.7° C./RH 80%), B (21.1° C./RH 50%), J (21.1° C./RH 10%); vertical axis (µC/g).
Figure 1E:
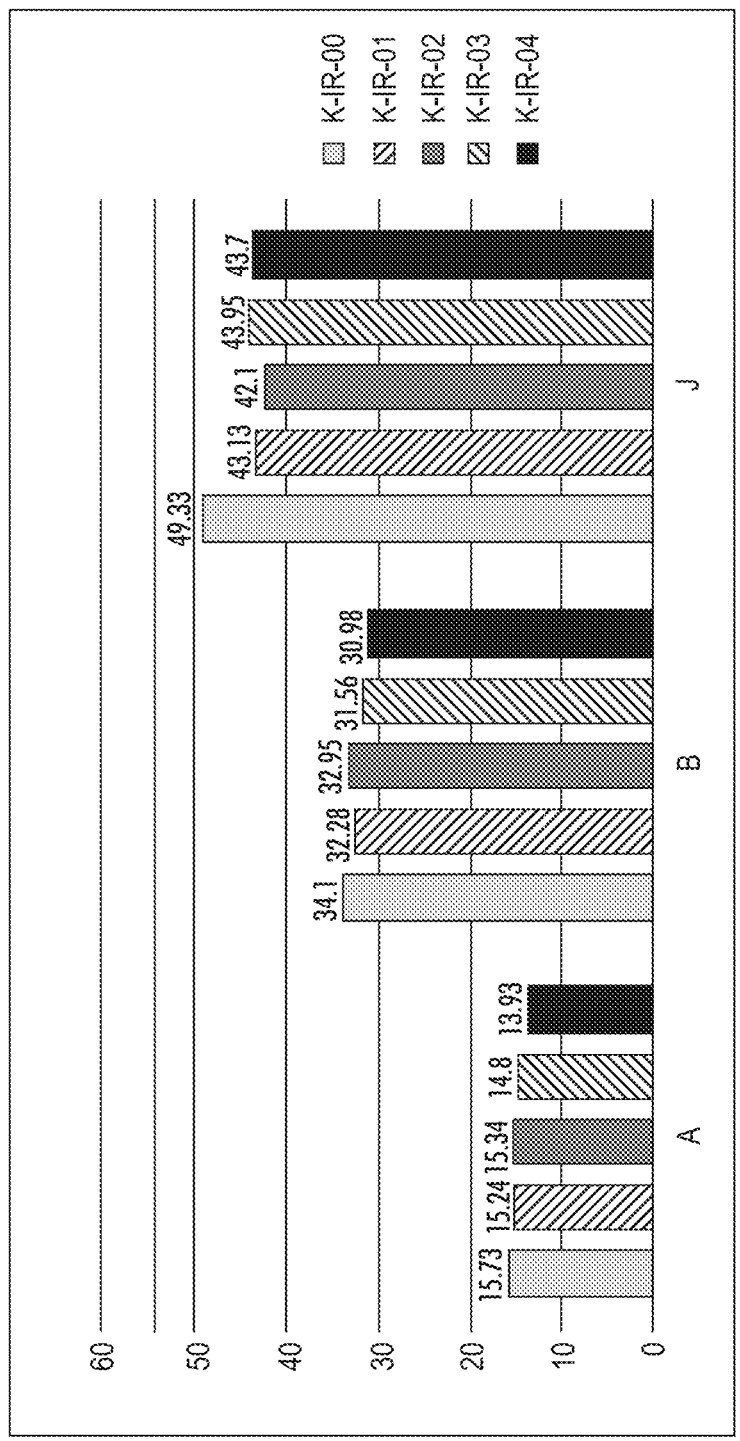
FIG. 1E shows graphical plots of triboelectric charging for five samples of black toner at five different taggant concentrations K-IR-00=0%, K-IR-01=0.1 wt %, K-IR-02=0.5 wt %, K-IR-03=2 wt %, K-IR-04=5 wt % under different temperature/humidity conditions A (26.7° C./RH 80%), B (21.1° C./RH 50%), J (21.1° C./RH 10%); vertical axis (µC/g).

Embodiments herein provide toner compositions comprising toner particles having taggant materials disposed on their surface. The taggant materials may comprise inorganic infrared luminescent ceramic particles. Advantageously, the taggant particles do not interfere with toner charging and exhibit essentially no impact on color at threshold loading levels required for detection. Moreover, the taggant is readily incorporated during the normal blend processing of toner particles when other surface additives such as charge control agents are added, thus requiring no extra process steps.

In embodiments, there are provided toner compositions comprising toner particles comprising a resin and a colorant and an infrared luminescent taggant disposed on the surface of the toner particles. In embodiments, the toner particles are prepared by a chemical process. For example, the toner particles may be the product of an emulsion/aggregation (EA) process. Other chemical processes for toner particle formation include, without limitation, suspension polymerization, polyester elongation polymerization, and chemical milling. In embodiments, the toner particles may be prepared by conventional methods, such as by melt mixing and pulverization (and/or milling).

In embodiments, the taggant is a ceramic. In embodiments, the ceramic comprises oxides of silicon, yttrium, lithium, ytterbium, and cerium.

In embodiments, the taggant is nanoparticulate.

In embodiments, the taggant is present in an amount from about 0.05 parts per hundred to about 5 parts per hundred of toner particles. In embodiments, toner color is clear or yellow and the taggant is present in a concentration in a range from about 0.05 parts per hundred to about 0.1 parts per hundred of toner particles. In embodiments, toner color is magenta and the taggant is present at about 0.5 parts per hundred of toner particles. In embodiments, toner color is cyan and the taggant is present from about 1 to about 2 parts per hundred of toner particles. In embodiments, toner color is black and the taggant is present at about 5 parts per hundred of toner particles.

In embodiments, the toner particles comprise a styrene-acrylate polymer, an amorphous polyester, a crystalline polyester, or combinations thereof.

In embodiments, there are provided methods of making a toner composition comprising toner particles comprising a resin and a colorant, the toner composition further comprising an infrared luminescent taggant disposed on the surface of the toner particles, the method comprising blending toner particles with a surface additive package comprising the infrared luminescent taggant.

In embodiments, the surface additive package further comprises a charge control agent.

In embodiments, the taggant is a nanoparticulate ceramic comprising oxides of silicon, yttrium, lithium, ytterbium, and cerium.

In embodiments, the taggant is present in an amount from about 0.05 parts per hundred to about 5 parts per hundred of toner particles.

In embodiments, there are provided articles comprising a printed image disposed on the articles, the printed image made with a toner composition comprising toner particles comprising a resin and a colorant, the toner composition further comprising an infrared luminescent taggant disposed on the surface of the toner particles, the printed image allowing authentication of the articles by infrared detection of the infrared luminescent taggant.

In embodiments, the article is an identification badge. In embodiments, the article is a form of currency. Other articles include, without limitation, application to labels for a brand product, document with invisible encrypt information, and infrared sensor printed on textile fabrics or polymer films.

In embodiments, the taggant is a nanoparticulate ceramic comprising oxides of silicon, yttrium, lithium, ytterbium, aluminum, titanium cerium, zinc, and zirconium.

In embodiments, the taggant is present in an amount from about 0.05 parts per hundred to about 5 parts per hundred of toner particles.

In embodiments there are provided methods comprising printing an image on a substrate with a toner composition comprising toner particles comprising a colorant and an infrared luminescent taggant disposed on the surface of the toner particles, wherein the taggant serves security means for authenticating the substrate.

Resin

In embodiments, the toner particles may comprise a resin. The resin may comprise a polyester, a styrene-acrylate, or combinations thereof. In embodiments, the polyester is amorphous, crystalline, or combinations thereof. In embodiments, the resin comprises a high molecular weight amorphous polyester, a low molecular weight amorphous polyester, and a crystalline polyester. Toners of the present disclosure may include a latex resin in combination with a pigment. While the latex resin may be prepared by any method within the purview of those skilled in the art, in embodiments the latex resin may be prepared by emulsion polymerization methods, including semi-continuous emulsion polymerization, and the toner may include emulsion aggregation toners. Emulsion aggregation involves aggregation of both submicron latex and pigment particles into toner size particles, where the growth in particle size is, for example, in embodiments from about 1 micron to about 15 microns.

Any monomer suitable for preparing a latex for use in a toner may be utilized. As noted above, in embodiments the toner may be produced by emulsion aggregation. Suitable monomers useful in forming a latex emulsion, and thus the resulting latex particles in the latex emulsion, include, but are not limited to, styrenes, acrylates, methacrylates, butadienes, isoprenes, acrylic acids, methacrylic acids, acrylonitriles, combinations thereof, and the like.

In embodiments, the resin of the latex may include at least one polymer. In embodiments, at least one may be from about one to about twenty and, in embodiments, from about three to about ten. Exemplary polymers include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof. The polymer may be block, random, or alternating copolymers. In addition, polyester resins obtained from the reaction products of bisphenol A and propylene oxide or propylene carbonate, and in particular including such polyesters followed by the reaction of the resulting product with fumaric acid (as disclosed in U.S. Pat. No. 5,227,460, the disclosure of which is hereby incorporated by reference in its entirety), and branched polyester resins resulting from the reaction of dimethylterephthalate with 1,3-butanediol, 1,2-propanediol, and pentaerythritol, may also be used.

In embodiments, a poly(styrene-butyl acrylate) may be utilized as the latex. The glass transition temperature of this latex may be from about 35° C. to about 75° C., in embodiments from about 40° C. to about 70° C.

The toner compositions may include core particles comprising an amorphous polyester resin. The amorphous polyester resin may be formed by reacting a diol with a diacid in the presence of an optional catalyst. Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diol selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin. In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

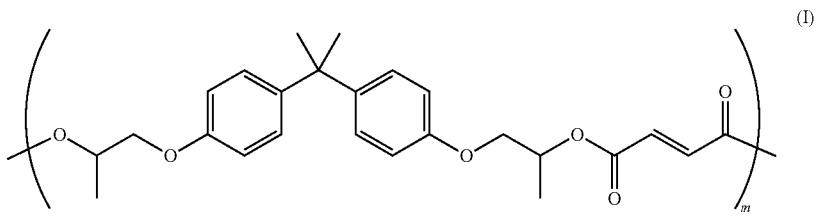

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

In embodiments, the resins utilized as the resin binder may have a glass transition temperature of from about 30° C. to about 80° C., in embodiments from about 35° C. to about 70° C. In further embodiments, the resins utilized as the resin binder may have a melt viscosity of from about 10 to about 1,000,000 Pa*S at about 130° C., in embodiments from about 20 to about 100,000 Pa*S.

The crystalline resins, which are available from a number of sources, can be prepared by a polycondensation process by reacting an organic diol, and an organic diacid in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and can be selected in an amount, for example, of from about 0.01 to about 1 mole percent of the resin. Additionally, in place of the organic diacid, an organic diester can also be selected, whereby an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methyl-pentanedial, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin. There can be selected for the third latex branched amorphous resin an alkali sulfonated polyester resin. Examples of suitable alkali sulfonated polyester resins include, the metal or alkali salts of copoly(ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly-(propoxylated bisphenol-A-fumarate)-copoly(propoxylated bisphenol-A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion.

Examples of crystalline based polyester resins include alkali copoly(5-sulfo-isophthaloyl)-co-poly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-co-poly(butylene-adipate), alkali copoly(5-sulfo-isopthaloyl)-copoly(pentylene-adipate), alkali copoly(5-sulfo-isopthaloyl)-copoly(hexylene-adipate), alkali copoly(5-sulfo-isophthaloyl)-copoly(octylene-adipate), alkali copoly(5-sulfo-isophthaloyl)-copoly(ethylene-succinate), alkali copoly(5-sulfo-isophthaloyl-copoly(butylene-succinate), alkali copoly(5-sulfo-isophthaloyl)-copoly(hexylene-succinate), alkali copoly(5-sulfo-isophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate); and wherein alkali is a metal of sodium, lithium or potassium, and the like. In embodiments, the alkali metal is lithium.

The crystalline resin may be present, for example, in an amount of from about 5 to about 50 percent by weight of the toner components, in embodiments from about 10 to about 35 percent by weight of the toner components. The crystalline resin can possess various melting points of, for example, from about 30° C. to about 120° C., in embodiments from about 50° C. to about 90° C. The crystalline resin may have a number average molecular weight (Mn), as measured by gel permeation chromatography (GPC) of, for example, from about 1,000 to about 50,000, in embodiments from about 2,000 to about 25,000, and a weight average molecular weight (Mw) of, for example, from about 2,000 to about 100,000, in embodiments from about 3,000 to about 80,000, as determined by Gel Permeation Chromatography using polystyrene standards. The molecular weight distribution (Mw/Mn) of the crystalline resin may be, for example, from about 2 to about 6, in embodiments from about 3 to about 4.

Surfactants

In embodiments, the latex may be prepared in an aqueous phase containing a surfactant or co-surfactant. Surfactants which may be utilized with the resin to form a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. In embodiments a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX890™ and ANTAROX 897™ can be utilized.

The choice of particular surfactants or combinations thereof, as well as the amounts of each to be used, are within the purview of those skilled in the art.

Latex Prepared by Emulsion Polymerization

Initiators

In embodiments initiators may be added for formation of the latex. Examples of suitable initiators include water soluble initiators, such as ammonium persulfate, sodium persulfate and potassium persulfate, and organic soluble initiators including organic peroxides and azo compounds including Vazo peroxides, such as VAZO64™, 2-methyl 2-2'-azobis propanenitrile, VAZO88™, 2-2'-azobis isobutyramide dehydrate, and combinations thereof. Other water-soluble initiators which may be utilized include azoamidine compounds, for example 2,2'-azobis(2-methyl-N-phenyl-propionamidine)dihydrochloride, 2,2'-azobis[N-(4-chloro-phenyl)-2-methylpropionamidine]di-hydrochloride, 2,2'-azobis[N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent, and in embodiments of from about 0.2 to about 5 weight percent of the monomers.

Chain Transfer Agents

In embodiments, chain transfer agents may also be utilized in forming the latex. Suitable chain transfer agents include dodecane thiol, octane thiol, carbon tetrabromide, combinations thereof, and the like, in amounts from about 0.1 to about 10 percent and, in embodiments, from about 0.2 to about 5 percent by weight of monomers, to control the molecular weight properties of the polymer when emulsion polymerization is conducted in accordance with the present disclosure.

Stabilizers

In embodiments, it may be advantageous to include a stabilizer when forming the latex particles. Suitable stabilizers include monomers having carboxylic acid functionality. Such stabilizers may be of the following formula (I):

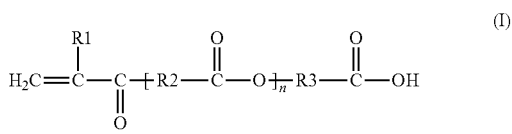

wherein R1 is hydrogen or a methyl group; R2 and R3 are independently selected from alkyl groups containing from about 1 to about 12 carbon atoms or a phenyl group; n is from about 0 to about 20, in embodiments from about 1 to about 10. Examples of such stabilizers include beta carboxyethyl acrylate (β-CEA), poly(2-carboxyethyl)acrylate, 2-carboxyethyl methacrylate, combinations thereof, and the like. Other stabilizers which may be utilized include, for example, acrylic acid and its derivatives.

In embodiments, the stabilizer having carboxylic acid functionality may also contain a small amount of metallic ions, such as sodium, potassium and/or calcium, to achieve better emulsion polymerization results. The metallic ions may be present in an amount from about 0.001 to about 10 percent by weight of the stabilizer having carboxylic acid functionality, in embodiments from about 0.5 to about 5 percent by weight of the stabilizer having carboxylic acid functionality.

Where present, the stabilizer may be added in amounts from about 0.01 to about 5 percent by weight of the toner, in embodiments from about 0.05 to about 2 percent by weight of the toner.

Additional stabilizers that may be utilized in the toner formulation processes include bases such as metal hydroxides, including sodium hydroxide, potassium hydroxide, ammonium hydroxide, and optionally combinations thereof. Also useful as a stabilizer is sodium carbonate, sodium bicarbonate, calcium carbonate, potassium carbonate, ammonium carbonate, combinations thereof, and the like. In embodiments a stabilizer may include a composition containing sodium silicate dissolved in sodium hydroxide.

In the emulsion polymerization process, the reactants may be added to a suitable reactor, such as a mixing vessel. The appropriate amount of at least two monomers, in embodiments from about two to about ten monomers, stabilizer, surfactant(s), initiator, if any, chain transfer agent, if any, and wax, if any, and the like may be combined in the reactor and the emulsion aggregation process may be allowed to begin. Suitable waxes are described in greater detail below as a component to be added in the formation of a toner particle; such waxes may also be useful, in embodiments, in forming a latex. Reaction conditions selected for effecting the emulsion polymerization process include temperatures of, for example, from about 45° C. to about 120° C., in embodiments from about 60° C. to about 90° C.

Nanometer size particles may be formed, from about 50 nm to about 800 nm in volume average diameter, in embodiments from about 100 nm to about 400 nm in volume average diameter, as determined, for example, by a Microtrac/Nanotrac particle analyzer.

After formation of the latex particles, the latex particles may be utilized to form a toner. In embodiments, the toners may be an emulsion aggregation type toner that are prepared by the aggregation and fusion of the latex particles of the present disclosure with a colorant, and one or more additives such as surfactants, coagulants, waxes, surface additives, and optionally combinations thereof.

Colorants

The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. In embodiments, the surfactant may be ionic and may be from about 1 to about 25 percent by weight, and in embodiments from about 4 to about 15 percent by weight, of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or combinations thereof. In embodiments a pigment may be utilized. As used herein, a pigment includes a material that changes the color of light it reflects as the result of selective color absorption. In embodiments, in contrast with a dye which may be generally applied in an aqueous solution, a pigment generally is insoluble. For example, while a dye may be soluble in the carrying vehicle (the binder), a pigment may be insoluble in the carrying vehicle.

In embodiments wherein the colorant is a pigment, the pigment may be, for example, carbon black, phthalocyanines, quinacridones, red, green, orange, brown, violet, yellow, fluorescent colorants including RHODAMINE B™ type, and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED48™, LEMON CHROME YELLOW DCC1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido)phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant. Pigment Red 122 (sometimes referred to herein as PR-122) has been widely used in the pigmentation of toners, plastics, ink, and coatings, due to its unique magenta shade.

Coagulants

In embodiments, a coagulant may be added during or prior to aggregating the latex and the aqueous colorant dispersion. The coagulant may be added over a period of time from about 1 minute to about 60 minutes, in embodiments from about 1.25 minutes to about 20 minutes, depending on the processing conditions.

Examples of suitable coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, combinations thereof, and the like. One suitable coagulant is PAC, which is commercially available and can be prepared by the controlled hydrolysis of aluminum chloride with sodium hydroxide. Generally, PAC can be prepared by the addition of two moles of a base to one mole of aluminum chloride. The species is soluble and stable when dissolved and stored under acidic conditions if the pH is less than about 5. The species in solution is believed to contain the formula Al3O4(OH)24(H2O)12 with about 7 positive electrical charges per unit.

In embodiments, suitable coagulants include a polymetal salt such as, for example, polyaluminum chloride (PAC), polyaluminum bromide, or polyaluminum sulfosilicate. The polymetal salt can be in a solution of nitric acid, or other diluted acid solutions such as sulfuric acid, hydrochloric acid, citric acid or acetic acid. The coagulant may be added in amounts from about 0.01 to about 5 percent by weight of the toner, and in embodiments from about 0.1 to about 3 percent by weight of the toner.

Wax

Wax dispersions may also be added during formation of a latex or toner in an emulsion aggregation synthesis. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or combinations thereof. Suitable surfactants include those described above. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasel K.K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL 74, 89, 130, 537, and 538, all available from Johnson Diversey, Inc, or chlorinated polypropylenes and polyethylenes commercially available from Allied Chemical, Baker Petrolite Corporation and Johnson Diversey, Inc.

The wax may be present in an amount of from about 0.1 to about 30 percent by weight, and in embodiments from about 2 to about 20 percent by weight of the toner.

In embodiments, a wax with appropriate melting properties may be a polymethylene wax, a polyethylene wax, or a Fischer-Tropsch wax. In embodiments, combinations of any of the foregoing waxes may be employed. A wax may be included in the core and/or shell particles of the toner. The wax can include any of the various waxes conventionally used in emulsion aggregation toner compositions. Suitable examples of waxes include polyethylene, polymethylene, polypropylene, polyethylene/amide, polyethylenetetrafluoroethylene, and polyethylenetetrafluoroethylene/amide. Other examples include, for example, polyolefin waxes, such as polyethylene waxes, including linear polyethylene waxes and branched polyethylene waxes, and polypropylene waxes, including linear polypropylene waxes and branched polypropylene waxes; paraffin waxes; Fischer-Tropsch waxes; amine waxes; silicone waxes; mercapto waxes; polyester waxes; urethane waxes; modified polyolefin waxes (e.g., a carboxylic acid-terminated polyethylene wax or a carboxylic acid-terminated polypropylene wax); amide waxes, such as aliphatic polar amide functionalized waxes; aliphatic waxes consisting of esters of hydroxylated unsaturated fatty acids; high acid waxes, such as high acid montan waxes; microcrystalline waxes, such as waxes derived from distillation of crude oil; and the like. By "high acid waxes" it is meant a wax material that has a high acid content. The waxes can be crystalline or non-crystalline, as desired. By "crystalline polymeric waxes" it is meant that a wax material contains an ordered array of polymer chains within a polymer matrix that can be characterized by a crystalline melting point transition temperature, Tm. The crystalline melting temperature is the melting temperature of the crystalline domains of a polymer sample. This is in contrast to the glass transition temperature, Tg, which characterizes the temperature at which polymer chains begin to flow for the amorphous regions within a polymer. Tg and Tm are typically measured by Differential scanning calorimetry (DSC).

To incorporate the wax into the toner, it is desirable for the wax to be in the form of one or more aqueous emulsions or dispersions of solid wax in water, where the solid wax particle size is usually in the range of from about 100 to about 500 nm. The toner compositions may contain the wax in any amount of from, for example, about 3 to about 15% by weight of the toner, on a dry basis. For example, the toners can contain from about 5 to about 11% by weight of the wax.

pH Adjusting Agent

In some embodiments a pH adjustment agent may be added to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally combinations thereof. Suitable acids include nitric acid, sulfuric acid, hydrochloric acid, citric acid, acetic acid, and optionally combinations thereof.

Aggregating Agents

Any aggregating agent capable of causing complexation might be used in forming toner of the present disclosure. Alkali earth metal or transition metal salts can be utilized as aggregating agents. In embodiments, alkali (II) salts can be selected to aggregate sodium sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally combinations thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, combinations thereof, and the like.

The resultant blend of latex, optionally in a dispersion, colorant dispersion, optional wax, optional coagulant, and optional aggregating agent, may then be stirred and heated to a temperature below the Tg of the latex, in embodiments from about 30° C. to about 70° C., in embodiments of from about 40° C. to about 65° C., for a period of time from about 0.2 hours to about 6 hours, in embodiments from about 0.3 hours to about 5 hours, resulting in toner aggregates of from about 3 microns to about 15 microns in volume average diameter, in embodiments of from about 4 microns to about 8 microns in volume average diameter.

In embodiments, a shell may be formed on the aggregated particles. Any latex utilized noted above to form the latex resin may be utilized to form the shell latex. In embodiments, a styrene-n-butyl acrylate copolymer may be utilized to form the shell latex. In embodiments, the latex utilized to form the shell may have a glass transition temperature of from about 35° C. to about 75° C., in embodiments from about 40° C. to about 70° C.

Where present, a shell latex may be applied by any method within the purview of those skilled in the art, including dipping, spraying, and the like. The shell latex may be applied until the desired final size of the toner particles is achieved, in embodiments from about 3 microns to about 12 microns, in other embodiments from about 4 microns to about 8 microns.

Once the desired final size of the toner particles is achieved, the pH of the mixture may be adjusted with a base to a value of from about 3.5 to about 7, and in embodiments from about 4 to about 6.5. The base may include any suitable base such as, for example, alkali metal hydroxides such as, for example, sodium hydroxide, potassium hydroxide, and ammonium hydroxide. The alkali metal hydroxide may be added in amounts from about 0.1 to about 30 percent by weight of the mixture, in embodiments from about 0.5 to about 15 percent by weight of the mixture.

The mixture of latex, colorant and optional wax is subsequently coalesced. Coalescing may include stirring and heating at a temperature of from about 80° C. to about 99° C., in embodiments from about 85° C. to about 98° C., for a period of from about 0.5 hours to about 12 hours, and in embodiments from about 1 hour to about 6 hours.

The pH of the mixture may then be lowered to from about 3.5 to about 6, in embodiments from about 3.7 to about 5.5, with, for example, an acid to coalesce the toner aggregates. Suitable acids include, for example, nitric acid, sulfuric acid, hydrochloric acid, citric acid or acetic acid. The amount of acid added may be from about 0.1 to about 30 percent by weight of the mixture, and in embodiments from about 1 to about 20 percent by weight of the mixture.

The mixture is cooled in a cooling or freezing step. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling media such as, for example, ice, dry ice and the like, to effect rapid cooling to a temperature of from about 20° C. to about 40° C., and in embodiments of from about 22° C. to about 30° C.

After this cooling, the aggregate suspension may be heated to a temperature at or above the Tg of the latex. Where the particles have a core-shell configuration, heating may be above the Tg of the first latex used to form the core and the Tg of the second latex used to form the shell, to fuse the shell latex with the core latex. In embodiments, the aggregate suspension may be heated to a temperature of from about 80° C. to about 90° C., in embodiments from about 83° C. to about 86° C., for a period of time from about 1 hour to about 6 hours, in embodiments from about 2 hours to about 4 hours.

The toner slurry may then be washed. Washing may be carried out at a pH of from about 7 to about 12, and in embodiments at a pH of from about 9 to about 11. The washing may be at a temperature of from about 30° C. to about 70° C., and in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Charge Control Agents

In embodiments, the toner composition surface additives may comprise charge control agents as desired. For example, the toner can include positive or negative charge control agents in any desired or effective amount, in one embodiment in an amount of at least about 0.1 percent by weight of the toner, and in another embodiment at least about 1 percent by weight of the toner, and in one embodiment no more than about 10 percent by weight of the toner, and in another embodiment no more than about 3 percent by weight of the toner. Examples of suitable charge control agents include, but are not limited to, quaternary ammonium compounds inclusive of alkyl pyridinium halides; bisulfates; alkyl pyridinium compounds, including those disclosed in U.S. Pat. No. 4,298,672, the disclosure of which is totally incorporated herein by reference; organic sulfate and sulfonate compositions, including those disclosed in U.S. Pat. No. 4,338,390, the disclosure of which is totally incorporated herein by reference; cetyl pyridinium tetrafluoroborates; distearyl dimethyl ammonium methyl sulfate; aluminum salts such as BONTRON E84™ or E88™ (Hodogaya Chemical); and the like, as well as mixtures thereof. Such charge control agents can be applied simultaneously with the shell resin described above or after application of the shell resin.

Other Surface Additives

Further optional additives which may be combined with a toner include any additive to enhance the properties of toner compositions. Included are surface additives, color enhancers, etc. Surface additives that can be added to the toner compositions after washing or drying include, for example, metal salts, metal salts of fatty acids, colloidal silicas, metal oxides, strontium titanates, combinations thereof, and the like, which additives are each usually present in an amount of from about 0.1 to about 10 weight percent of the toner, in embodiments from about 0.5 to about 7 weight percent of the toner. Examples of such additives include, for example, those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, can also be selected in amounts, for example, of from about 0.05 to about 5 percent by weight of the toner, in embodiments from about 0.1 to about 2 percent by weight of the toner. These additives can be added during the aggregation or blended into the formed toner product.

Toner particles produced utilizing a latex of the present disclosure may have a size of about 1 micron to about 20 microns, in embodiments about 2 microns to about 15 microns, in embodiments about 3 microns to about 7 microns. Toner particles of the present disclosure may have a circularity of from about 0.9 to about 0.99, in embodiments from about 0.92 to about 0.98.

Taggant Surface Additive

In embodiments, the taggant surface additive comprises a ceramic material comprising various metal oxides. In embodiments, the ceramic material comprises silica, yttrium oxide, lithium oxide, ytterbium oxide, and cerium oxide. An exemplary ceramic material is available from Stardust Materials LLC (Vancouver, Wash.) as IR luminescent pigment. Another non-limiting exemplary taggant material is the far-infrared nanopowder/nanoparticles made from a combination of oxides such as $Al_2O_3$, $MgO$, $ZnO$, $ZrO_2$, $SiO_2$, etc. available from US Research Nanomaterials, Inc. (Houston, Tex.).

Uses

Toner in accordance with the present disclosure can be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure can be selected for electrophotographic imaging and printing processes such as digital imaging systems and processes.

Developer compositions can be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the disclosures of each of which are hereby incorporated by reference in their entirety. The carriers may be present from about 1 percent by weight of the toner to about 10 percent by weight of the toner, in embodiments from about 4 percent by weight to about 6 percent by weight of the toner. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, combinations thereof and other known components.

Development may occur via discharge area development. In discharge area development, the photoreceptor is charged and then the areas to be developed are discharged. The development fields and toner charges are such that toner is repelled by the charged areas on the photoreceptor and attracted to the discharged areas. This development process is used in laser scanners.

Development may be accomplished by the magnetic brush development process disclosed in U.S. Pat. No. 2,874, 063, the disclosure of which is hereby incorporated by reference in its entirety. This method entails the carrying of a developer material containing toner of the present disclosure and magnetic carrier particles by a magnet. The magnetic field of the magnet causes alignment of the magnetic carriers in a brush like configuration, and this "magnetic brush" is brought into contact with the electrostatic image bearing surface of the photoreceptor. The toner particles are drawn from the brush to the electrostatic image by electrostatic attraction to the discharged areas of the photoreceptor, and development of the image results. In embodiments, the conductive magnetic brush process is used wherein the developer includes conductive carrier particles and is capable of conducting an electric current between the biased magnet through the carrier particles to the photoreceptor.

Imaging

The toner compositions disclosed herein may be used in conjunction with an electrophotographic imaging member such as photoreceptor in various imaging systems such as those conventionally known as xerographic imaging devices or electrophotographic image forming devices. Such imaging members may be selected for imaging and printing systems with visible, near-red and/or infrared light. The imaging members may be negatively or positively charged, exposed to light having a wavelength of from about 700 to about 900 nanometers, such as generated by solid state lasers, e.g., arsenide-type lasers, either sequentially or simultaneously, followed by developing the resulting image and transferring it to a print substrate such as transparency or paper. Additionally, the imaging members may be selected for imaging and printing systems with visible light. The imaging members may be negatively or positively charged, exposed to light having a wavelength of from about 400 to about 700 nanometers, followed by development with a known toner, and then transferring and fixing of the image on a print substrate.

Generally, the imaging member may be first charged with a corona charging device such as a corotron, dicorotron, scorotron, pin charging device, bias charging roll (BCR) or the like. Then, an electrostatic image is generated on the imaging member with an electrostatic image forming device. Subsequently, the electrostatic image is developed by known developing devices at one or more developing stations that apply developer compositions such as, for example, compositions comprised of resin particles, pigment particles, additives including charge control agents and carrier particles, etc., reference being made to, for example, U.S. Pat. Nos. 4,558,108; 4,560,535; 3,590,000; 4,264,672; 3,900,588 and 3,849,182, the disclosures of each of these patents being totally incorporated herein by reference. The developed electrostatic image is then transferred to a suitable print substrate such as paper or transparency at an image transfer station, and affixed to the substrate. Development of the image may be achieved by a number of methods, such as hybrid scavengeless development, magnetic brush, and the like.

Transfer of the developed image to a print substrate may be by any suitable method, including those wherein a corotron or a biased roll is selected. The fixing step may be performed by means of any suitable method, such as flash fusing, heat fusing, pressure fusing, vapor fusing, and the like.

Following transfer of the developed image from the imaging member surface, the imaging member may be cleaned of any residual developer remaining on the surface, and also cleaned of any residual electrostatic charge prior to being subjected to charging for development of a further or next image.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1

This example describes the preparation and characterization of toners comprising taggant in accordance with embodiments described herein.

A series of toner formulations were prepared including clear, yellow, magenta, cyan, and black as indicated in Table 1.

TABLE 1

| Color | Toner ID | Taggant (ppH) | IR Detected? |
|---|---|---|---|
| Clear | CL-IR-01 | 0.05 | Yes |
|  | CL-IR-02 | 0.1 | Yes |
| Yellow | Y-IR-01 | 0.05 | Yes |
|  | Y-IR-02 | 0.1 | Yes |
| Magenta | M-IR-01 | 0.1 | No |
|  | M-IR-02 | 0.5 | Yes |
| Cyan | C-IR-01 | 0.1 | No |
|  | C-IR-02 | 0.5 | No |
|  | C-IR-03 | 1 | Yes |
|  | C-IR-04 | 2 | Yes |
| Black | K-IR-01 | 0.1 | No |
|  | K-IR-02 | 0.5 | No |
|  | K-IR-03 | 2 | No |
|  | K-IR-04 | 5 | Yes |

Each toner color was blended with a small amount of a ceramic infrared taggant (IR luminescent pigment available from Stardust Materials LLC, Vancouver, Wash.) comprising silica (34%), yttrium oxide (32%), lithium oxide (16%), ytterbium oxide (12%), and cerium oxide (6%).

Toner Additive Blending 75 grams of toner particles were added to a benchtop blender, followed by addition of 3.5% by weight of silica additive RY50 (available from Nippon Aerosil), 1.6% of titania additive SMT5103 (available from Tayca Corporation), 0.5% of zinc stearate additive (available from Ferro Corporation), 0.1% of silica additive H2050EP (available from Wacker Chemie) and 0.1% of taggant powder (Stardust Materials LLC). The contents were then blended at approximately 15,000 rpm for 2.5 minutes to give the final blended toner herein.

FIGS. 1A-E show the triboelectric charging for the various toners comprising taggant along with a control.

Toner charging measurement: Toner charging was collected for the blended toner particles with surface additives and the IR taggant. 4.5 grams of toner and 100 grams of Xerox Soken MP-116 carrier were mixed in a 60 mL glass bottle, to prepare a 4.5 pph of toner in carrier. Samples were conditioned three days in a low-humidity zone (J zone) at 21.1° C. and 10% RH and a separate sample in a high humidity zone (A zone) at about 28° C./85% relative humidity. The developers with parent toner particles were charged in a Turbula mixer for 10 minutes, the developers with additive blended toner were charged in a Turbula mixer for 60 minutes.

The toner charge was measured as the charge per mass ratio (Q/M), also referred to as tribo and determined by the total blow-off charge method, measuring the charge on a faraday cage containing the developer after removing the toner by blow-off in a stream of air. The total charge collected in the cage is divided by the mass of toner removed by the blow-off, by weighing the cage before and after blow-off to give the Q/M ratio or tribo result.

Figure 2:
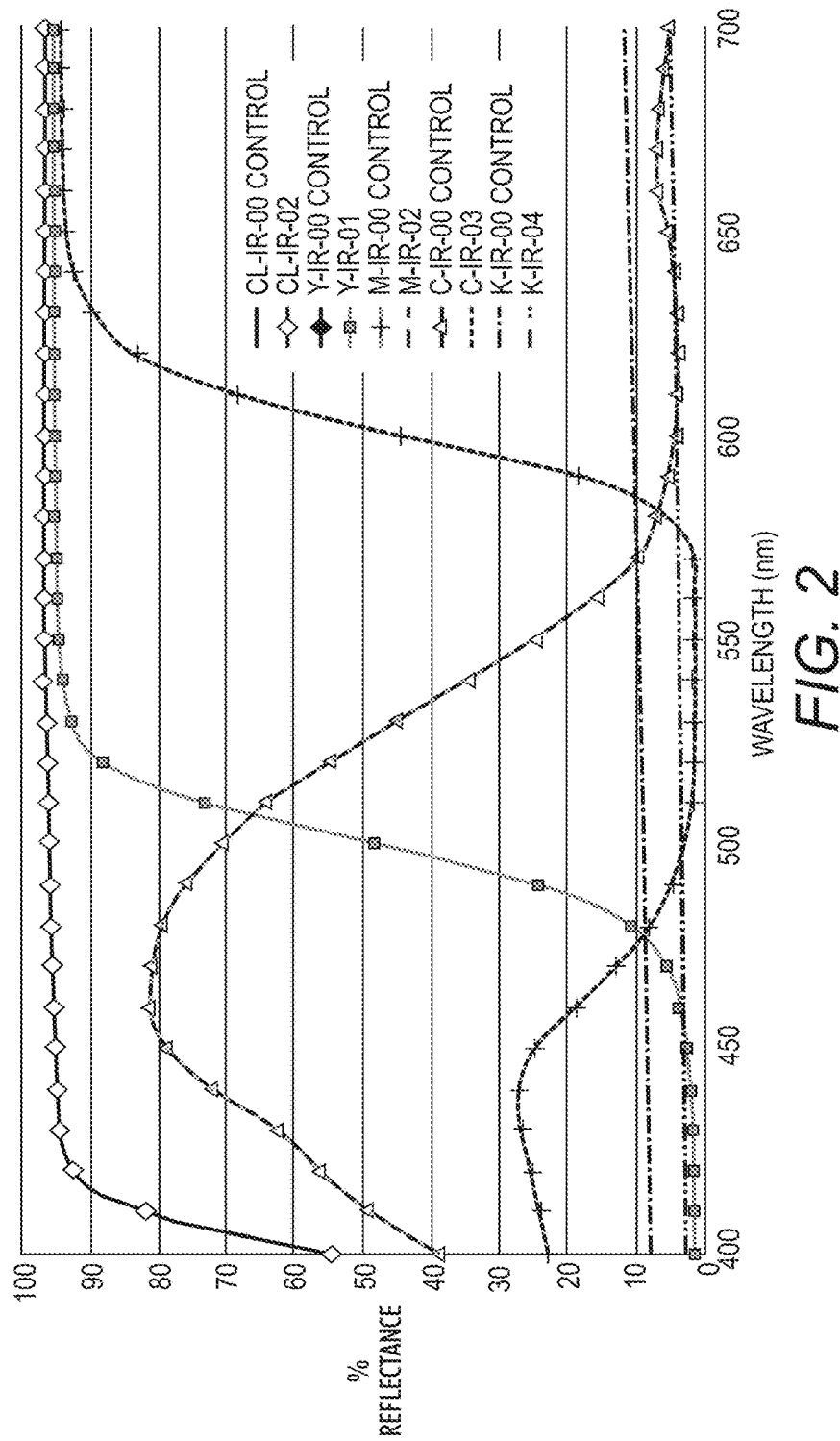
FIG. 2 shows a plot of percent reflectance versus wavelength for various colored toners comprising taggants listed in Table 1.

FIG. 2 shows the color characterization for the various indicated toners. The samples were wetted with surfactant and suspended in water. They were then filtered through a membrane to achieve a uniform deposit. The membranes were then dried and fused for analysis by color spectrophotometer. The amount of sample filtered can be adjusted to any TMA (toner mass area), and sampled in a series. Measurement by the X-Rite 939 gives data on the color values L*, a*, b*, C*, and h*, as well as spectral data from 400 to 700 nm.

What is claimed is:

1. A toner composition comprising toner particles comprising a resin and a colorant, the toner composition further comprising an infrared luminescent taggant comprising a ceramic oxide disposed on the surface of the toner particles, wherein the taggant is present in an amount from about 0.05 parts per hundred to about 5 parts per hundred of toner particles.

2. The toner composition of claim 1, wherein the ceramic oxide comprises silicon, yttrium, lithium, ytterbium, or cerium.

3. The toner composition of claim 1, wherein the taggant is nanoparticulate.

4. The toner composition of claim 1, wherein toner color is clear or yellow and the taggant is present in a concentration in a range from about 0.05 parts per hundred to about 1 parts per hundred of toner particles.

5. The toner composition of claim 1, wherein toner color is magenta and the taggant is present from about 0.5 to about 2 parts per hundred of toner particles.

6. The toner composition of claim 1, wherein toner color is cyan and the taggant is present from about 1 to about 5 parts per hundred of toner particles.

7. The toner composition of claim 1, wherein toner color is black and the taggant is present at 5 parts per hundred of toner particles.

8. The toner composition of claim 1, wherein the toner particles comprise a styrene-acrylate polymer, an amorphous polyester, a crystalline polyester, or combinations thereof.

9. The toner composition of claim 1, wherein the toner particles are prepared by a chemical process.

10. The toner particles of claim 1, wherein the toner particles are prepared by melt mixing and pulverization.

11. A method of making a toner composition comprising toner particles comprising a resin and a colorant, the toner composition further comprising an infrared luminescent taggant disposed on the surface of the toner particles, the method comprising:
   blending toner particles with a surface additive package comprising the infrared luminescent taggant, wherein the taggant comprises a ceramic oxide and is present in an amount from about 0.05 parts per hundred to about 5 parts per hundred of toner particles.

12. The method of claim 11, wherein the surface additive package further comprises a charge control agent.

13. The method of claim 11, wherein the taggant is a nanoparticulate ceramic comprising oxides of silicon, yttrium, lithium, ytterbium, and cerium.

14. The method of claim 11, wherein the taggant is present in an amount from about 0.05 parts per hundred to about 5 parts per hundred of toner particles.

15. An article comprising a printed image disposed on the article, the printed image made with a toner composition comprising toner particles comprising a resin and a colorant, the toner composition further comprising an infrared luminescent taggant disposed on the surface of the toner particles, the printed image allowing authentication of the article by infrared detection of the infrared luminescent taggant, wherein the taggant comprises a ceramic oxide and is present in an amount from about 0.05 parts per hundred to about 5 parts per hundred of toner particles.

16. The article of claim 15, wherein the article is an identification badge or a form of currency.

17. The article of claim 15, wherein the taggant is a nanoparticulate ceramic comprising oxides of silicon, yttrium, lithium, ytterbium, and cerium.

18. The article of claim 15, wherein the taggant is present in an amount from about 0.05 parts per hundred to about 5 parts per hundred of toner particles.

* * * * *